May 28, 1940.      R. O. JOHNSON      2,202,345
POWER TAKE-OFF ATTACHMENT
Filed Nov. 2, 1939
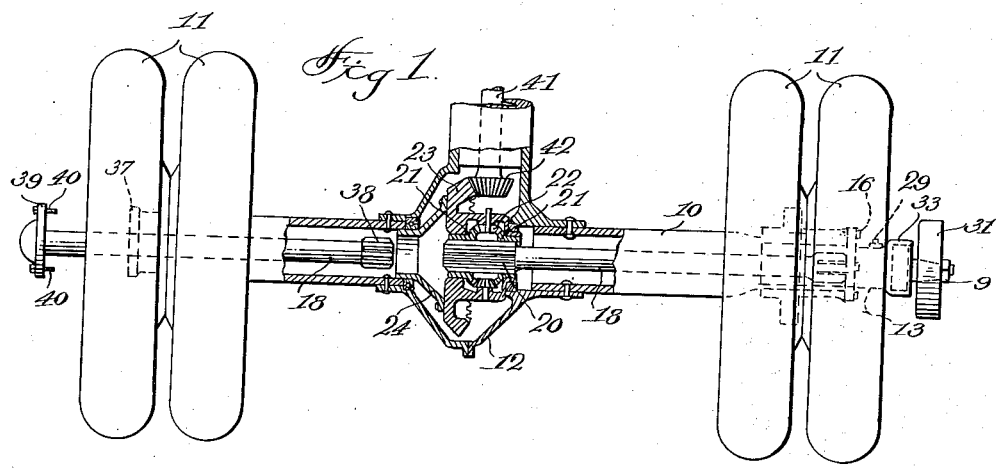
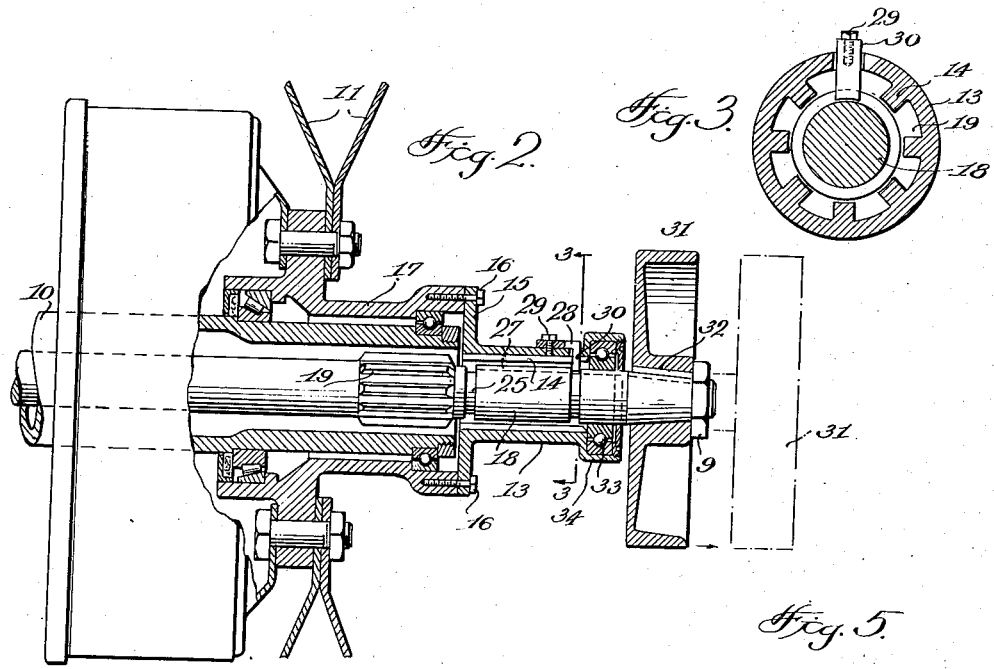
Rudolph O. Johnson
INVENTOR
BY Victor J. Evans & Co.
ATTORNEYS Patented May 28, 1940

2,202,345

UNITED STATES PATENT OFFICE 2,202,345

POWER TAKE-OFF ATTACHMENT

Rudolph O. Johnson, Bedford, Pa.

Application November 2, 1939, Serial No. 302,606

3 Claims. (Cl. 180—53)

This invention relates to power take-off attachments and has for an object to provide a power take-off attachment adapted to be applied to the rear wheel and axle of a motor vehicle.

A further object is to provide a device of this character which may be easily coupled and uncoupled from the wheel.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a plan view of a power take-off attachment constructed in accordance with the invention, shown applied to a motor vehicle rear axle.

Figure 2 is a longitudinal sectional view of the power take-off device uncoupled from the rear wheel.

Figure 3 is a cross sectional view taken on the line 3—3 of Figure 2.

Figure 4 is a detail perspective view of one end of the axle showing the longitudinal and spaced circumferential spline grooves.

Figure 5 is a side elevation of the ball bearing which supports the axle when in pulley driving position.

Referring now to the drawing in which like characters of reference designate similar parts in the various views, 10 designates the rear axle housing, 11 dual type rear wheels, and 12 the differential of a motor vehicle.

In carrying out the invention, as shown in Figure 2, a sleeve 13 is provided, having on the inner periphery a spline 14, as shown best in Figure 3. The sleeve is provided at one end with a flange 15 which is bolted as shown at 16 to the hub 17 of one of the rear wheels 11. The sleeve 13 surrounds the rear axle 18 which latter is provided with an outer spline 19 adapted to interfit the spline 14 of the sleeve to couple the rear wheel to the axle. The axle is also provided with inner spline 20 adapted to couple the axle to the differential spline gears 21 which mesh with planetary gears 22 carried by the differential ring gear 23, which latter is provided with an integral substantially funnel shaped cage bearing 24 which floats in the axle housing.

The spline 20 is of such length that it engages both spline gears 21 of the differential when the axle 18 is moved inwardly but only engages the spline gear 21 shown on the right of Figure 1 when the axle is moved outwardly. Thus the axle is rotated at all times, but when the axle is moved inwardly to engage the pline 20 with both spline gears 21, the outer spline 19 of the axle is withdrawn from the spline 14 of the sleeve 13 and the wheel is uncoupled from the axle.

As best shown in Figure 4, the axle 18 is provided, beyond its outer spline 19, with a pair of annular grooves 25 and 26 concentric with the axis of the axle and with a longitudinal groove 27 which extends from the inner annular groove 25 through the outer annular groove 26 and terminates at the end of the axle. A latch 28 is secured to the sleeve 13 by a screw 29 and is provided with a finger 30 which extends through an opening in the sleeve and is adapted to be engaged in the inner annular groove 25 when the axle is pulled outwardly to engage the spline 14 of the sleeve with the outer spline 19 of the axle to couple the axle to the wheel. The finger rides in the longitudinal groove 27 and lodges in the outer annular groove 26 when the axle is pushed endwise inwardly to disengage the spline 14 of the sleeve from the spline 19 of the axle to uncouple the wheel from the axle.

When the wheel is uncoupled from the axle as above explained power may be taken from the axle and for this purpose preferably a power take-off pulley 31 is secured to the end of the axle by a key 32 which is engaged in the outer end of the longitudinal groove 27, and by a nut 9 which is threaded on to the end of the axle.

The axle is supported in pulley driving position by a ball bearing assembly 33 which is confined in an annular housing 34 best shown in Figures 2 and 5. The housing is formed integral with the sleeve 13. The seat member 35 of the ball bearing assembly is provided with a spline 36 which is engaged in the outer end of the longitudinal groove 27 in the axle and secures the seat member for rotation as a unit with the axle.

The axle 18 is formed in two sections, one of which has already been described. The other section is slidably mounted in the hub 37 of the left rear wheels and is provided on its inner end with a spline 38. The outer end of the left axle section is provided with a flange 39 which is provided with screw bolts 40 adapted to detachably secure the flange to the hub 37.

Under normal driving conditions the right section of the axle 18 is disposed outwardly so that the inner spline 20 engages the right spline gear 21, and the left axle section is disposed inwardly so that the spline 38 engages the left spline gear 21. Also the flange 39 is bolted to the hub 37. Also the outer spline 19 of the right section of the axle is engaged with the spline 14 of the sleeve 13. In this position of the parts the wheels are coupled to the axle to be driven by the differential through the propeller shaft 41 and bevel gear 42 which is enmeshed with the ring gear 23.

When it is desired to take off power from the axle the flange 39 of the left section of the axle is disconnected from the left wheel and the axle section is drawn outwardly to disengage the spline 38 from the differential as shown in Figure 1. Then the right section of the axle is moved inwardly to engage the inner spline 20 with both spline gears 21 of the differential and to disengage the outer spline 19 of the axle from the sleeve 13, as shown in Figure 2. In this position of the parts the right and left dual rear wheels are disconnected from the rear axle and the right section of the rear axle is connected to the differential to be driven at variable speeds by the differential to drive the power take-off pulley 31.

From the above description it is thought that the construction and operation of the invention will be fully understood without further explanation.

What is claimed is:

1. A power take-off attachment for motor vehicles comprising the combination with the rear wheel, axle housing and differential of a motor vehicle, of a sectional axle movable endwise in the housing, a sleeve on one outer end of the axle fixed to the wheel, a spline on the inner surface of the sleeve, an outer spline on the axle adapted to be engaged with the spline of the sleeve for rotating the wheel when the axle is moved outwardly and adapted to be disengaged from the spline of the sleeve to uncouple the wheel from the axle when the axle is moved inwardly, a ball bearing carried by the sleeve supporting the axle, a power take-off pulley on the axle adjacent the bearing, and an inner spline on the axle engaged at all times with the differential for selectively driving the wheel or the pulley.

2. A power take-off attachment for motor vehicles comprising the combination with the rear wheel, axle housing and differential of a motor vehicle, of a sectional axle movable endwise in the housing, a sleeve on one outer end of the axle fixed to the wheel, a spline on the inner surface of the sleeve, an outer spline on the axle adapted to be engaged with the spline of the sleeve for rotating the wheel when the axle is moved outwardly and adapted to be disengaged from the spline of the sleeve to uncouple the wheel from the axle when the axle is moved inwardly, a ball bearing carried by the sleeve supporting the axle, said axle having a pair of spaced circumferential grooves connected by a longitudinal groove, a latch secured to the sleeve and adapted to be selectively engaged in the circumferential groove to hold the axle at either limit of its endwise movement, a power take-off pulley on the axle adjacent the bearing, and an inner spline on the axle engaged at all times with the differential for selectively driving the wheel or the pulley.

3. A power take-off attachment for motor vehicles comprising the combination with the rear wheels and axle housing of a motor vehicle, of a differential having a ring gear, a funnel-shaped cage bearing connected to the ring gear and mounting the ring gear to float in the axle housing, planetary gears carried by the ring gear, a pair of spline gears driven by the planetary gears, a sectional axle movable endwise in the housing, one section of the axle being removably secured to one of the rear wheels of the axle and having a spline adapted to engage one of said spline gears, the other section of the axle having a spline adapted to engage both spline gears when the first named axle section is moved outwardly and adapted to engage one of the spline gears when moved endwise outwardly, a sleeve on the outer end of the last named section of the axle fixed to the other rear wheel, a spline on the inner surface of the sleeve, an outer spline on the last named axle section adapted to be engaged with the spline of the sleeve for rotating the wheel when the axle section is moved outwardly and adapted to be disengaged from the spline of the sleeve to uncouple the wheel from the axle when the axle section is moved inwardly, a ball bearing carried by the sleeve supporting the last named axle section, and a power take-off pulley on the last named axle section adjacent the sleeve.

RUDOLPH O. JOHNSON.